Oct. 9, 1923.
R. S. BURN
VALVE FOR PNEUMATIC TIRES
Filed Oct. 9, 1922
1,470,271
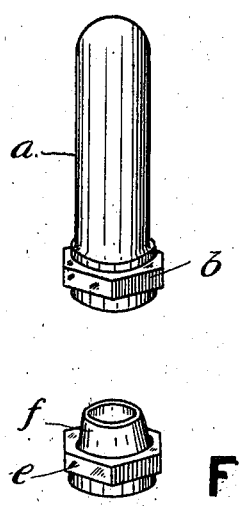
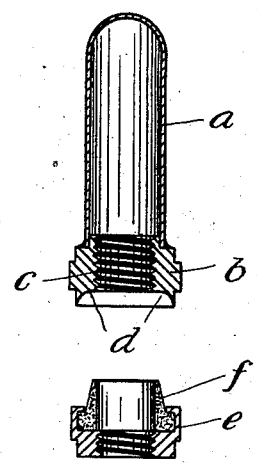
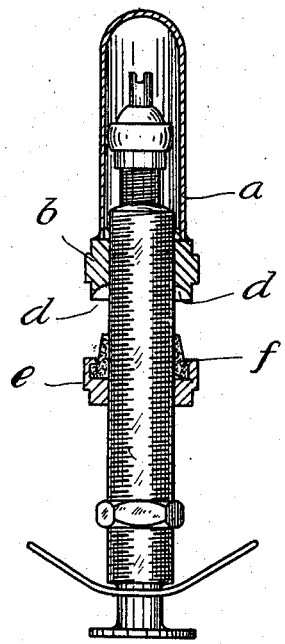
Inventor.
Robinson S. Burn
by Herbert W. Jenner
Attorney.

Patented Oct. 9, 1923.

1,470,271

UNITED STATES PATENT OFFICE.

ROBINSON SCALING BURN, OF BIRMINGHAM, ENGLAND.

VALVE FOR PNEUMATIC TIRES.

Application filed October 9, 1922. Serial No. 593,262.

*To all whom it may concern:*

Be it known that I, ROBINSON SCALING BURN, a subject of the King of Great Britain, of "The Poplars," Wylde Green, Birmingham, England, have invented certain new and useful Improvements in and Relating to Valves for Pneumatic Tires, of which the following is a specification.

This invention relates to improvements in valves for pneumatic tires, and has for its object to provide an improved hood or cap by which leakage of air from the valve is entirely prevented, and the access of water or other foreign matter to the valve is rendered impossible.

With this object in view it has been proposed to employ a closed hood or cap member which is threaded upon the valve, and has at its open end a resilient washer which cooperates with a rim-nut when the hood member is screwed down thereon, a further resilient washer being in some cases provided on the rim-nut to cooperate with the first resilient washer.

There is, however, a considerable tendency for the resilient washer on the hood member to foul the screw-thread on the valve as the member is screwed down, and where a further washer is provided on the rim-nut the engagement of the two resilient washers causes a tearing or distortion of the faces of the washers, and, in use, the joint soon ceases to be airtight.

In my invention these difficulties are overcome, and my invention essentially comprises a metal hood member having at its open end a rigid smooth surface which is adapted to cooperate, as the hood is screwed down on the valve, with an upstanding resilient washer or sleeve carried on the upper face of the rim-nut to surround the valve. The rigid smooth surface in action gathers and compresses the resilient member tightly around the screw-threaded valve, and a perfectly air-tight joint is obtained so that no leakage of air can occur from the valve even if the latter is defective. At the same time the valve is completely protected against water, dust, or other foreign matter.

I prefer an internally coned rigid surface on the hood and a tapered, or conical, resilient washer on the upper face of the rim-nut, and this preferred embodiment is illustrated in the appended drawings in which—

Figure 1 is a perspective view of the cap and rim-nut.

Figure 2 is an elevation in section.

Figure 3 is an elevation in section showing the cap and rim-nut upon a valve.

In the drawings, *a* is the cap, of brass or other suitable metal, closed at the upper end and provided with an external hexagonal portion *b* or with wing portions by which it may be rotated. An internal thread *c* near the lower end is adapted to receive the thread on a valve, and in the lower end of the cap is formed a tapered or conical recess *d* as shown in section in Fig. 2.

The rim-nut consists of a hexagonal or winged body *e*, threaded to receive the valve and has an undercut recess on its upper face to receive the rubber or other resilient conical washer *f*.

In use the rim-nut is screwed down upon the valve body until it abuts against the rim, and the cap *a* is then screwed down behind it until the recess *d* receives the washer *f*. As the washer *f* is on the upper face of the rim-nut there is no possibility of the washer fouling the thread on the valve body as the nut is screwed thereon, while the cooperation of the recess *d* with the washer *f* as the cap is screwed down causes the washer to be compressed around the valve body and ensures a perfectly air-tight joint.

I claim:

In valves for pneumatic tires the combination of a cap member closed at the upper end and having an internal screw thread to engage a screw-thread on the valve body, a tapered recess at the open lower end of the cap member extending without break or step from said open end to the internal bore of the cap, a rim-nut screwed upon the valve body below the cap, and a tapered resilient washer carried on the upper face of the rim-nut and surrounding the valve body, the angle which the sides of the recess in the cap member make with the vertical being greater than that made by the sides of the resilient washer so that the lower end of the cap gathers and compresses the upper part of the resilient washer snugly around the valve body to form an air-tight joint therewith.

In testimony whereof I affix my signature.

ROBINSON SCALING BURN.